(12) United States Patent
Szymanski

(10) Patent No.: US 10,377,282 B2
(45) Date of Patent: Aug. 13, 2019

(54) METHOD FOR MANUFACTURING OF UPHOLSTERED MASS TRANSIT VEHICLE CHAIRS

(71) Applicant: Maciej Szymanski, Rokietnica (PL)

(72) Inventor: Maciej Szymanski, Rokietnica (PL)

( * ) Notice: Subject to any disclaimer, the term of this patent is extended or adjusted under 35 U.S.C. 154(b) by 539 days.

(21) Appl. No.: 15/030,836

(22) PCT Filed: Apr. 22, 2014

(86) PCT No.: PCT/PL2014/000041
§ 371 (c)(1),
(2) Date: Apr. 20, 2016

(87) PCT Pub. No.: WO2015/065208
PCT Pub. Date: May 7, 2015

(65) Prior Publication Data
US 2016/0272097 A1    Sep. 22, 2016

(30) Foreign Application Priority Data

Oct. 28, 2013 (PL) .......................... 405812

(51) Int. Cl.
*B60N 2/70* (2006.01)
*B60N 2/68* (2006.01)
(Continued)

(52) U.S. Cl.
CPC ............ *B60N 2/70* (2013.01); *B29C 45/0001* (2013.01); *B60N 2/24* (2013.01); *B60N 2/242* (2013.01);
(Continued)

(58) Field of Classification Search
CPC .... B60N 2/68; B60N 2002/684; B60N 2/686; B60N 2/7017; B60N 2/24; B60N 2/242;
(Continued)

(56) References Cited

U.S. PATENT DOCUMENTS

| 3,557,264 A * | 1/1971 | Getz et al. ............. A47C 5/125 |
| | | 264/46.7 |
| 2005/0168040 A1 * | 8/2005 | Goosen .................. B60N 2/686 |
| | | 297/452.1 |

(Continued)

FOREIGN PATENT DOCUMENTS

| EP | 0916287 A2 | 5/1999 |
| FR | 2430211 A1 | 2/1980 |

OTHER PUBLICATIONS

International Search Report for corresponding International Application No. PCT/PL2014/000041.

*Primary Examiner* — Jermie E Cozart
(74) *Attorney, Agent, or Firm* — Egbert Law Offices, PLLC

(57) ABSTRACT

A method of method of manufacturing an upholstered chair for a mass transit vehicle includes forming a seat insert and a backrest insert, injection molding a layer of upholstery having enveloping flanges and beads at a periphery thereof, placing the upholstery onto the seat and backrest inserts such that the flanges and beads engage with an underside of the inserts, and attaching the seat insert and the backrest insert onto a chair frame. The flanges and beads secure the upholstery to the seat and backrest insert.

2 Claims, 3 Drawing Sheets

(51) Int. Cl.
  *B60N 2/64* (2006.01)
  *B60N 2/72* (2006.01)
  *B60N 2/24* (2006.01)
  *B29C 45/00* (2006.01)
  *B29K 27/06* (2006.01)
  *B29L 31/30* (2006.01)
  *B29L 31/00* (2006.01)

(52) U.S. Cl.
  CPC ............... *B60N 2/64* (2013.01); *B60N 2/68* (2013.01); *B60N 2/686* (2013.01); *B60N 2/7011* (2013.01); *B60N 2/7017* (2013.01); *B60N 2/72* (2013.01); *B29K 2027/06* (2013.01); *B29L 2031/3005* (2013.01); *B29L 2031/771* (2013.01); *B60N 2/643* (2013.01); *B60N 2/646* (2013.01); *B60N 2002/684* (2013.01); *Y10T 29/4981* (2015.01); *Y10T 29/4998* (2015.01)

(58) Field of Classification Search
  CPC .......... B60N 2/64; B60N 2/643; B60N 2/646; B29K 2027/06; B29L 2031/771; Y10T 29/481; Y10T 29/4998
  See application file for complete search history.

(56) References Cited

U.S. PATENT DOCUMENTS

| | | | |
|---|---|---|---|
| 2007/0104938 A1* | 5/2007 | Lin | B29C 44/28 428/304.4 |
| 2008/0136240 A1* | 6/2008 | Matthews | B60N 2/4235 297/354.1 |
| 2009/0108494 A1* | 4/2009 | Ito | A47C 7/022 264/258 |
| 2011/0121624 A1* | 5/2011 | Brncick | B60N 2/0232 297/284.2 |
| 2011/0133531 A1* | 6/2011 | Yeh | B60N 2/06 297/232 |
| 2011/0140499 A1* | 6/2011 | Masters | A47C 9/06 297/440.1 |
| 2013/0076092 A1* | 3/2013 | Kulkarni | B60N 2/643 297/301.1 |
| 2013/0082504 A1* | 4/2013 | Archambault | B60N 2/68 297/452.18 |
| 2013/0127225 A1* | 5/2013 | Kono | B60N 2/64 297/452.18 |
| 2013/0134749 A1* | 5/2013 | Awata | B60N 2/5825 297/216.13 |
| 2013/0241255 A1* | 9/2013 | Kulkarni | B60N 2/028 297/285 |
| 2015/0343929 A1* | 12/2015 | Yasuda | B60N 2/646 297/452.18 |

* cited by examiner

METHOD FOR MANUFACTURING OF UPHOLSTERED MASS TRANSIT VEHICLE CHAIRS

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The subject of the invention is a method for the manufacturing of upholstery, in particular for mass transit vehicle chairs, used in plants manufacturing mass transit vehicle chairs and in mass transit vehicle overhaul plants for chair regeneration.

2. Description of Related Art Including Information Disclosed Under 37 CFR 1.97 and 37 CFR 1.98

In the solution presented in patent claim P.394767 A1 the chair, in particular for mass transit vehicles, is characterised by the fact that in the top zone of the body it has at least two attachment points for attaching the attachment points of backrest upholstery and at least two snap sockets for engaging snap hooks, located in the front zone of the protective upholstery of the seat, and in addition the protective upholsteries of the backrest and seat, in their contact locations have a shaped block.

The solution presented in patent claim P.332665 A1 concerns seating, in particular to be used in public transport vehicles and in public places, characterised by that it contains a frame with stuffing and upholstery mounted on it, as well as a metal mesh with small holes, placed between the stuffing and the upholstery, advantageously glued to the upholstery and to the stuffing, whereas between the upholstery and the metal mesh there is a layer of fireproof fabric, advantageously connected with a metal mesh using a layer of glue. The chair in accordance with a PL 61860 Y1 utility model is composed of a frame—an uniform plastic shell and inserts for seat and backrest. The uniform shell has a full, profiled rear part and bottom part containing a flat side surface over the entire circumference of the shell. The inserts fully cover the free space of the shell and are adjacent to the side surface rim.

BRIEF SUMMARY OF THE INVENTION

The essence of the invention, which is a method for the manufacturing of upholstery, in particular for mass transit vehicle chairs, consists of that the external layer of the upholstery is constructed of an elastic plastic, advantageously PVC, through injection, and then the created cast profiles are placed on the seat and backrest insert, after which the seat and backrest are attached to the chair frame.

The upholstery manufactured in this manner, in particular for the mass transit vehicle chairs, formed by injection of elastic plastic, in accordance with the invention, the essence of which consists of the covering having an envelope collars for placing on the surface of the seat and backrest insert.

It is advantageous when between the upholstery and the insert an elastic layer is provided.

The use of the solution presented in the invention enables the following technical and utility effects:
- shortening the time required to create an upholstery,
- significant increase of the strength and durability of the upholstery,
- removing the necessity of upholstering of chairs with nonwoven fabric and upholstery staples,
- no possibility of devastation of the upholstery,
- the possibility of gluing additional elastic inserts, such as foam, between the external upholstery and the seat and/or backrest insert,
- reducing the construction and maintenance costs of the seat,
- possibility of disposal of the seat after the period of use,
- reduction of the chair weight.

BRIEF DESCRIPTION OF THE DRAWINGS

The subject of the invention, in an example, but not limiting, implementation was presented in diagrams on the figure, where on FIG. 1 the chair was shown with upholstery spread out, on FIG. 2 the seat was shown in a cross-section perpendicular to its lengthwise axis, on FIG. 3 the enlarged fragment B from FIG. 2 was shown.

DETAILED DESCRIPTION OF THE INVENTION

Figure 1:
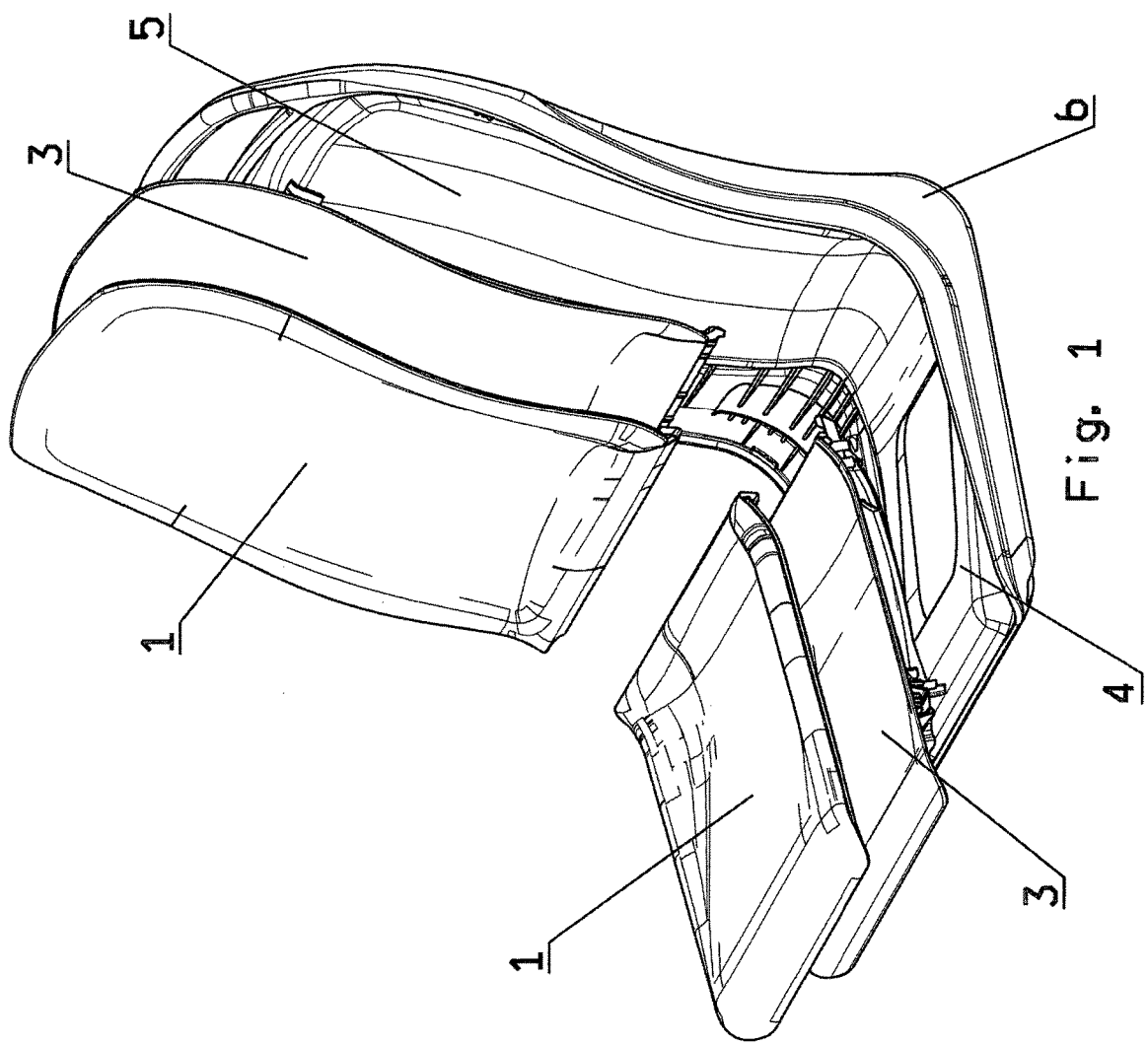
Figure 2:
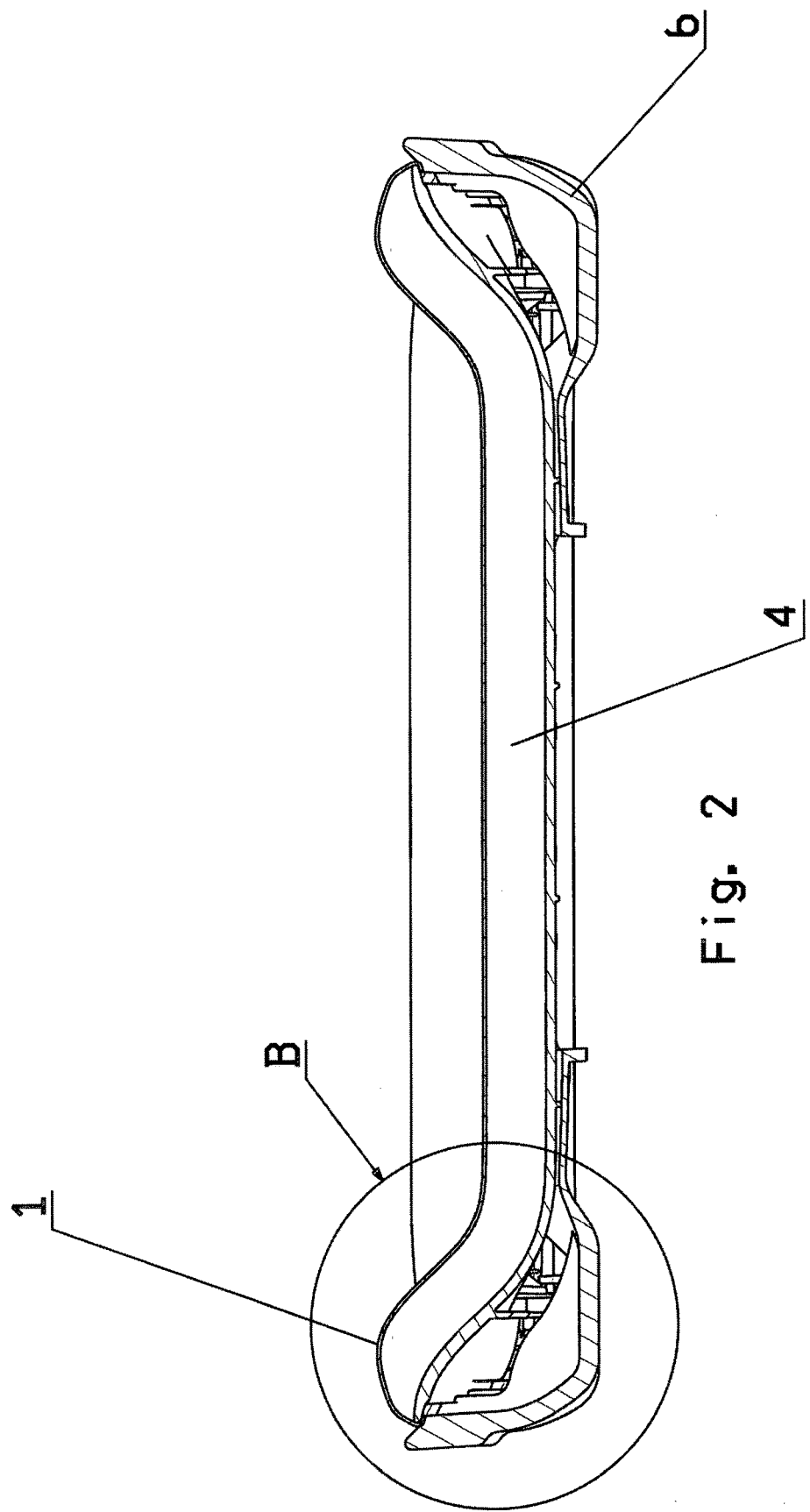
Figure 3:
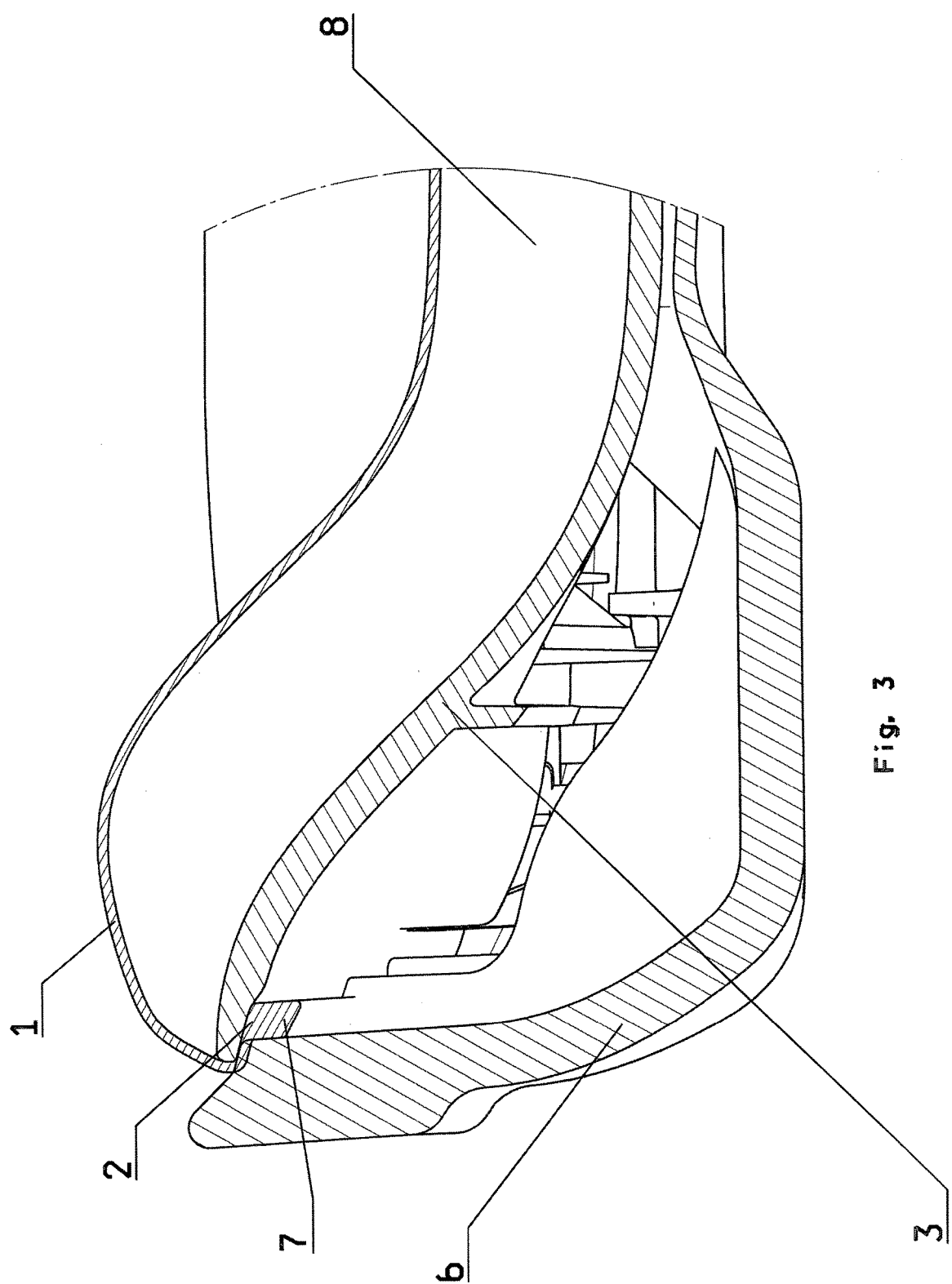

The external layer of upholstery 1 is manufactured by injection from elastic plastic, advantageously PVC. The injection process also shapes the enveloping flanges 2. The created cast profiles are placed over the insert 3 of the seat 4 and backrest 5, after which the seat 4 and backrest 5 are mounted to the frame 6 of the chair. Enveloping flanges 2 have beads 7 on the edges.

The upholstery 1 created through the injection of elastic plastic has enveloping flanges 2 for placing on the surface of the insert 3 of the seat 4 and backrest 5.

During the installation of the seat 4 or backrest 5, the upholstery 1 is placed on the insert 3, so that the flanges 2, due to their elasticity, are placed on the bottom side of the insert 3 of the seat 4 and backrest 5. The initial stabilisation of the upholstery on the inserts 3 of the seat 4 and backrest 5 will occur. Then such placed seat 4 and backrest 5 are placed in the recess of the frame 6 of the seat in such a manner that the contacting edges of the backrest 5 and seat 4 clamp down on the flanges of the rear zone of the seat 4 and the bottom zone of the backrest 5, after which the seat 4 and backrest 5 are mounted to the frame 6 in a known manner. The beads 7 are placed under the inserts 3, preventing the sliding out of the upholstery from the insert 3 of the seat 4 and backrest 5, whereas in the zone of contact of edges of the seat 4 and backrest 5 the beads 7 of the seat 4 and backrest 5 are locked in the gap between the seat 4 and the backrest 5.

A permanent locking of the upholstery in the frame 6 of the chair is thus obtained.

There are also versions where between the upholstery 1 and the insert 3 there is a layer of foam 8.

The invention claimed is:

1. A method of manufacturing an upholstered chair for a mass transit vehicle, the method comprising:
    forming a seat insert and a backrest insert, each of the seat insert and the backrest insert having a underside;
    injection molding a layer of upholstery from a plastic material such that the layer of upholstery has enveloping flanges at a periphery thereof, each of the enveloping flanges having a bead at an edge thereof;
    placing the injection molded layer of upholstery onto the seat insert and the backrest insert such that the enveloping flanges and the beads are at the underside of the seat insert and the backrest insert such that the injection molded layer of upholstery is securely retained in position against the seat insert and the backrest insert; and
    attaching the seat insert and the backrest insert onto a chair frame after the step of placing.

2. The method of claim 1, further comprising:
    placing an elastic layer between the layer of upholstery and the seat insert and the backrest insert.

\* \* \* \* \*